No. 12,641. REISSUED APR. 23, 1907.
H. T. MONSON.
COMBINED CULTIVATOR AND PLANTER.
APPLICATION FILED FEB. 14, 1907.
3 SHEETS—SHEET 1.
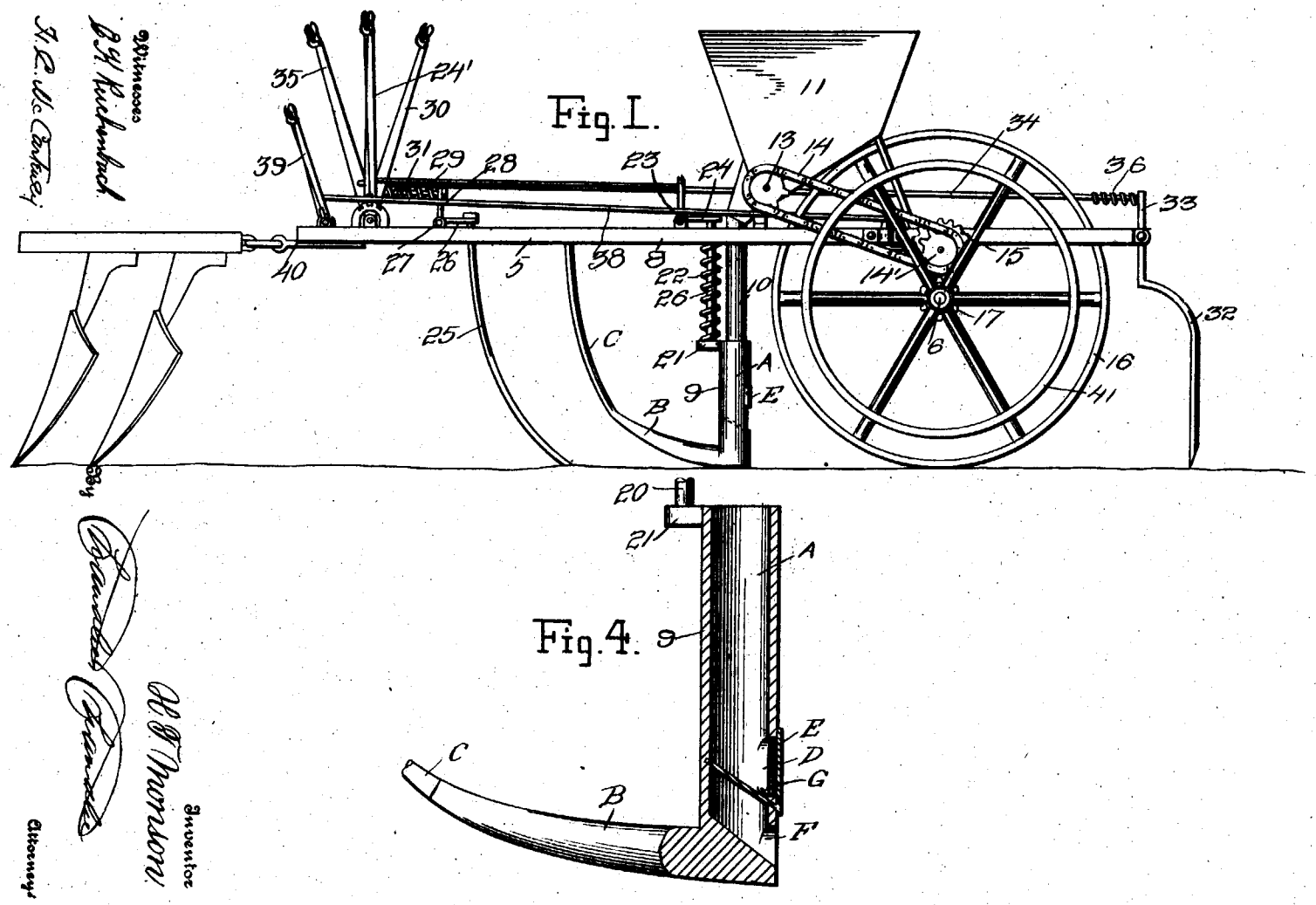
Witnesses
D. H. Kuchenbach.
H. R. McCartney
Inventor
H. T. Monson.
By Brandes & Brandes
Attorneys
THE NORRIS PETERS CO., WASHINGTON, D. C.

No. 12,641. REISSUED APR. 23, 1907.
H. T. MONSON.
COMBINED CULTIVATOR AND PLANTER.
APPLICATION FILED FEB. 14, 1907.
3 SHEETS—SHEET 2.
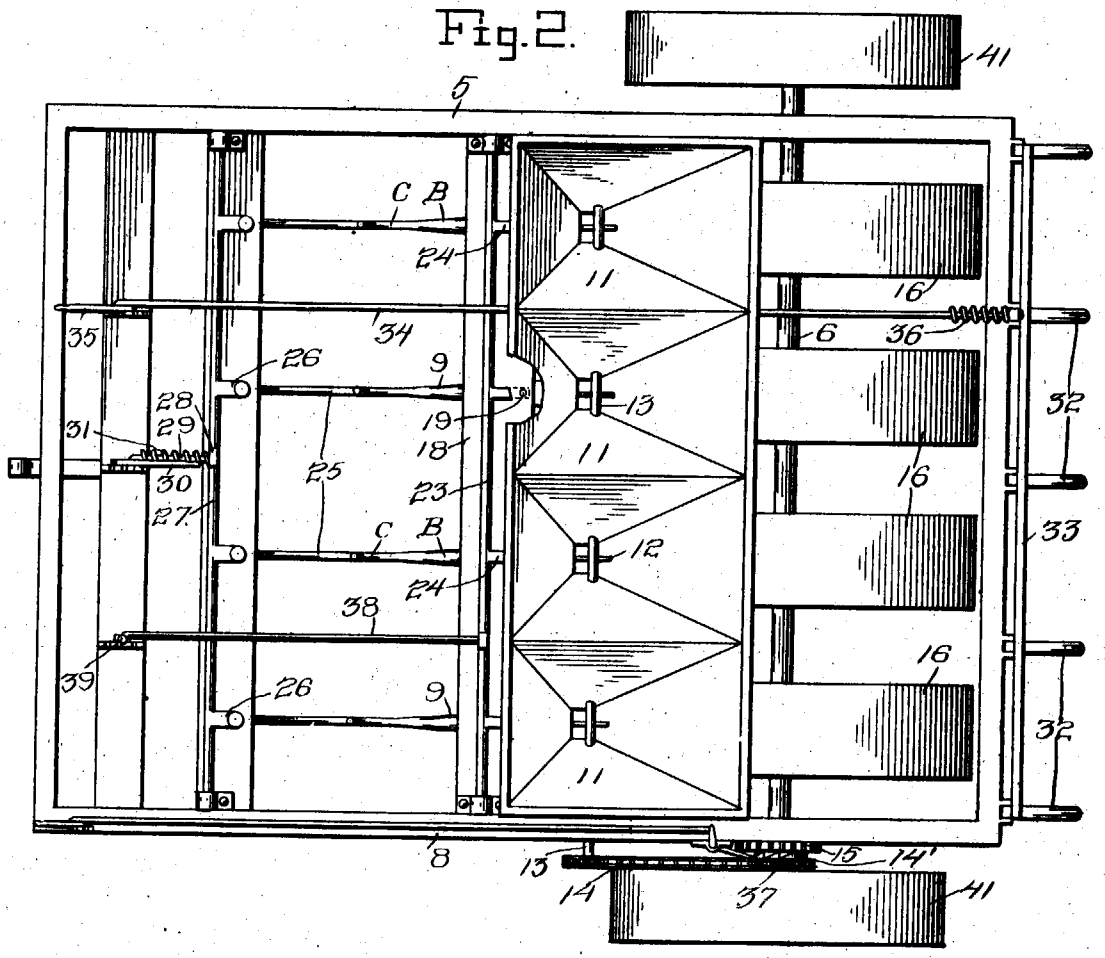
Witnesses
C. K. Kirchenbach
N. Q. McCartney
Inventor
H. T. Monson.
By Chandlee & Chandlee
Attorneys No. 12,641. REISSUED APR. 23, 1907.
H. T. MONSON.
COMBINED CULTIVATOR AND PLANTER.
APPLICATION FILED FEB. 14, 1907.
3 SHEETS--SHEET 3.
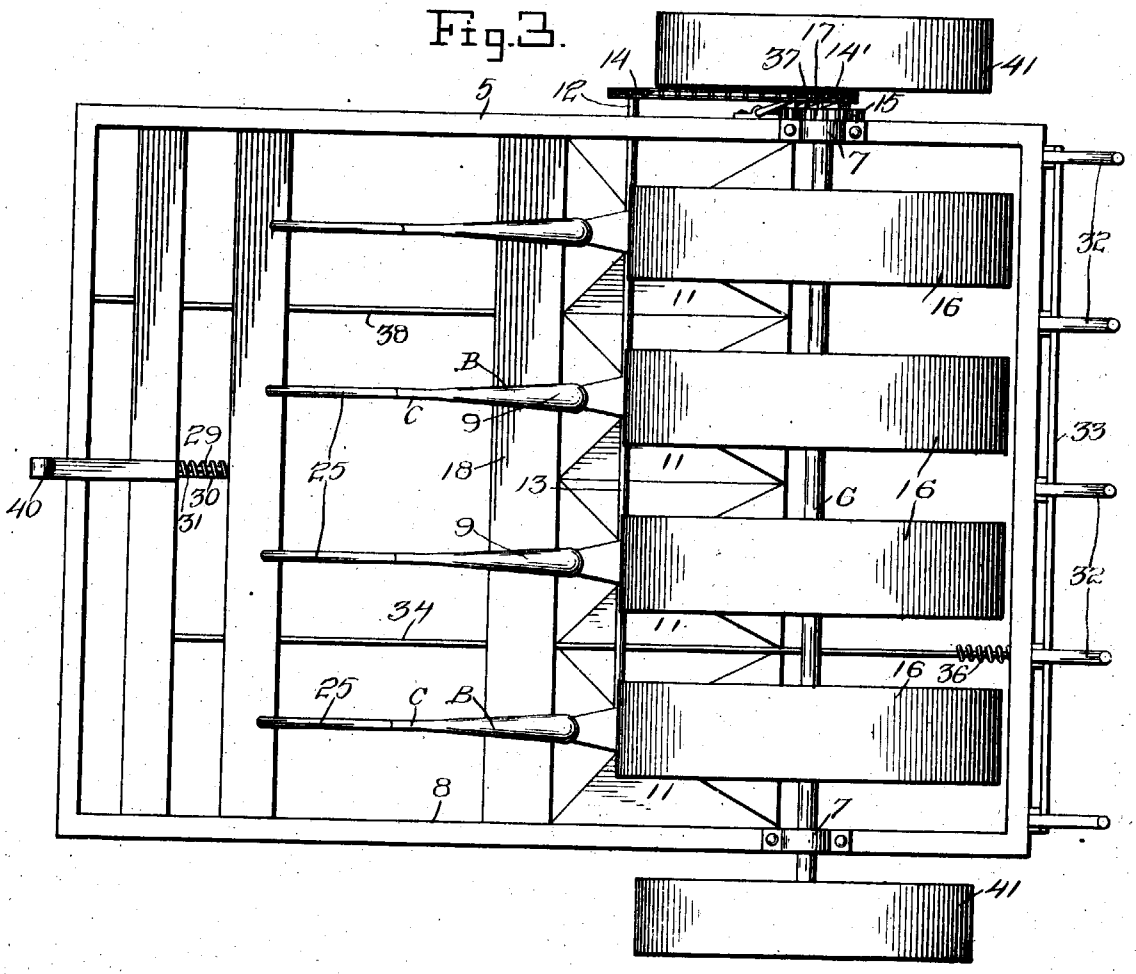
Witnesses
P. K. Reichenbach.
H. C. McCartney
Inventor
H. T. Monson.
By Thomas Ewen
Attorneys
THE NORRIS PETERS CO., WASHINGTON, D. C.

UNITED STATES PATENT OFFICE.

HENRY T. MONSON, OF MAYVILLE, NORTH DAKOTA.

COMBINED CULTIVATOR AND PLANTER.

No. 12,641. Specification of Reissued Letters Patent. Reissued April 23, 1907.

Original No. 803,503, dated October 31, 1905. Application for reissue filed February 14, 1907. Serial No. 357,416.

*To all whom it may concern:*

Be it known that I, HENRY T. MONSON, a citizen of the United States, residing at Mayville, in the county of Traill, State of North Dakota, have invented certain new and useful Improvements in Combined Cultivators and Planters; and I do hereby declare the following to be a full, clear, and exact description of the invention, such as will enable others skilled in the art to which it appertains to make and use the same.

This invention relates to farm implements, and more particularly to ground-treating implements, and has for its object to provide an implement which may be attached to a gang-plow and which will be arranged for operation to harrow the plowed ground and afterward plant seeds therein.

Another object is to provide means for preventing upsetting of the implement.

Other objects and advantages will be apparent from the following specification, which describes an embodiment of the present invention.

In the drawings forming a part of this specification, and in which like characters of reference indicate similar parts in the several views, Figure 1 is a side elevation of the invention attached to a gang-plow. Fig. 2 is a top plan view of the implement. Fig. 3 is a bottom plan view of the implement and Fig. 4 is a sectional view illustrating the arrangement of the shoes.

Referring now to the drawings, the present invention comprises a frame 5, in which there is mounted adjacent to the rearward end thereof a transverse shaft or axle 6, the latter being supported by brackets 7, depending from the side sills 8 of the frame. Secured to the frame and lying therebelow and forwardly of the shaft 6 there are a plurality of transversely spaced drill-shoes 9, with which upwardly-extending chutes 10 communicate, these chutes also communicating with a hopper 11, having discharge mechanism 12, the latter including a shaft 13, connected, by means of a sprocket-and-chain mechanism 14, with a gear 15, revolubly mounted in the frame.

A plurality of presser-wheels 16 are mounted upon the shaft 6 in spaced relation to each other and lie one behind each of the shoes 9, and one of these presser-wheels is provided with a gear 17, meshing with the gear 15. It will thus be apparent that as this presser-wheel revolves the discharge mechanism 12 will be actuated to cause seed from the hopper 11 to pass downwardly through the chutes 10 to the shoes 9 into the furrow opened by the shoes.

The frame 5 includes a transverse board 18, located forwardly of the chutes 10, and this board is provided with a longitudinal series of perforations 19, in which are engaged vertical stems 20, carried by forwardly-extending lugs 21, mounted upon the shoes at the upper portions thereof, helical springs 22 being engaged with the stems 20 to hold the shoes yieldably against upward movement, these springs resting at their upper ends against the board 18 and at their lower ends against the lugs 21.

A rock-shaft 23 is mounted in the frame upon the board 18 forwardly of the openings 19 and has rearwardly extending fingers 24, pivoted to the upper ends of the stems 20, so that when the rock-shaft is moved to raise the fingers the stems will be raised to lift the shoes from the ground, these shoes being arranged for upper movement with respect to the chutes 10, and a hand-lever 24′ is mounted upon the frame and connected with the rock-shaft 23 for movement thereof.

Depending from the frame 5 forwardly of the shoes 9 there are a plurality of rearwardly-curved ground-treating teeth 25, which are pivoted at their upper ends to fingers 26, carried by a rack-shaft 27, the fingers remaining normally horizontal. An upwardly-extending arm 28 is carried by the shaft 27 and is connected, by means of a link 29, with a hand-lever 30, the arrangement being such that this hand-lever may be operated to raise the ground-treating teeth 25 from the ground, though these teeth lie normally in engagement with the ground, in which position they are held by means of a helical spring 31, arranged for this purpose, as shown.

Extending downwardly from the frame 5 there are a plurality of spring ground-treating teeth 32, which are pivoted in the frame 5 adjacent to their upper ends and which above their pivot-points are connected by means of a transverse rod 33, having a forwardly-extending link 34 pivoted thereto, this link being pivoted at its forward end to a hand-lever 35, which may be moved to shift the link longitudinally and move the teeth 32 into and out of engagement with the ground. A helical spring 36 is engaged with the link 34 and is arranged to hold this link with the teeth 32 yieldably in operative position.

A clutch mechanism 37 is provided and is arranged for operation to disconnect the sprocket 14′ of the mechanism 14 from the gear-wheel 15, this sprocket-wheel being carried by the gear-wheel, and the clutch mechanism is connected, by means of a link 38, with a hand-lever 39, operable to move the clutch mechanism into and out of operative position.

The hand-levers 24′, 30, 35, and 39, are all located adjacent to the forward frame 5 and in close proximity to a clevis 40, by means of which the implement is attached to the gang-plow, as mentioned above.

In use the present implement having been attached to a gang-plow the latter is driven over a field to turn the soil, the clods being broken and harrowed by the teeth 25, after which the seed from the hopper 11 is discharged through the chute 10 to the shoes 9 and into the furrows opened by these shoes, the presser-wheels 16 following in the paths of the shoes 9 roll the ground upon which the seeds have been deposited, and thereafter the teeth 32, which lie in planes between those of the wheels, smooth the ground between the pairs of the wheels, throwing loose earth over the portions of the field in which the seeds have been planted.

The shaft or axle 6 extends laterally beyond the frame 5 and has revolubly mounted upon its ends a pair of wheels 41, which are of somewhat lesser diameter than the wheels 16, these wheels 41 coming into engagement with the ground only when the implement is tipped side-wise, and thus acting to prevent upsetting of the implement.

With the present implement it will be seen that land may be plowed, harrowed, and seeded in one operation, during which the horses drawing the implements will be given footing on solid ground, it being thus possible for them to perform the work with less exertion.

The drill-shoes 9 each include a hollow upright stock A, having a forwardly-extending foot or furrow-opener B, having a metal strap C secured to the toe thereof and extending upwardly to the frame 5, to which these straps C are secured. It is to the stocks A that the legs 21 are secured, and in the rearward portion of these stocks there are openings D, provided with vertically-sliding closures E. The shoes have the usual openings F in their bottoms for the passage of seed therefrom, and closures G are provided for these openings F and are movable into and out of operative position. It will thus be apparent that when the implement is to be used for drilling seed the openings D are closed and the openings G are opened to permit of the passage of the seed into the furrow formed by the shoes. When the seed is to be sown broadcast, the openings F are closed by means of the closures G, which are slides inserted in the stocks just below the openings D, and these openings being open the seed falls therefrom and is scattered upon the ground.

Owing to the provision upon the axle ends of balance or steadying wheels of less diameter than the presser or traction-wheels, it will be practically impossible for the implement to be upset, since, whenever the implement is tilted to one side or the other, the corresponding steadying wheel will come in contact with the ground and thus serve as a stop to prevent the implement from being further tilted.

What is claimed is:

1. The combination, with a frame, including traction wheels, of a transverse shaft provided at opposite ends with balance wheels of less diameter than the traction wheels to prevent the frame from upsetting.

2. In an implement of the class described, the combination with a frame, of a transverse shaft carried by said frame, and means mounted on each end of said shaft for balancing the implement and preventing the same from upsetting.

3. In an implement of the class described, the combination with a frame, of a transverse shaft carried by said frame, and means mounted on each end of said shaft for balancing the implement, said means being adapted to engage with the ground only when the implement is tilted to one side or the other, to prevent the implement from upsetting.

4. In an implement of the class described, the combination, with a frame, of an axle carried thereby, and a balance wheel mounted on each end of said axle to steady the implement and prevent the same from upsetting.

5. In an implement of the class described, the combination, with a frame including an axle, of presser wheels mounted upon said axle intermediate the ends thereof, and a balance wheel mounted on each end of said axle to steady the implement and prevent the same from upsetting.

6. In an implement of the class described, the combination, with a frame including an axle, the opposite ends of said axle extending beyond the corresponding side edges of the frame, of presser wheels mounted on said axle intermediate the ends thereof, and balancing means mounted on each end of said axle and adapted to engage with the ground only when the implement is tilted to one side or the other to prevent the same from upsetting.

7. In an implement of the class described, the combination with a frame including an axle, of presser wheels mounted upon said axle intermediate the ends thereof, and a balance wheel mounted upon each end of said axle, to steady the implement and prevent the same from upsetting, the diameter of the balance wheels being less than that of the presser wheels.

8. In an implement of the class described, the combination, with a frame, of a feed-box mounted upon the frame, shoes including an upwardly-extending hollow stock and a forwardly-extending foot, said shoes lying beneath the frame and in position for engagement with the ground, a chute communicating with the feed-box and with the upper ends of the stock, said stock having an opening therein at its rearward portion above the foot, and having a second opening adjacent to its lower end, and removable closures for the openings.

9. An implement of the class described comprising a frame, a shaft mounted in the frame transversely thereof, ground-treating devices carried by the frame, presser-wheels revolubly mounted upon the shaft, said shaft extending outwardly beyond the outermost presser-wheels and balancing-wheels revolubly mounted upon the outer ends of the shaft, said balancing-wheels being of lesser diameter than the presser-wheels.

10. In an implement of the class described the combination with a frame, of a feed-box mounted upon the frame, shoes including an upwardly-extending hollow stock and a forwardly-extending foot, a plate secured at one end to the toe of the foot and at its other end to the frame, said shoes lying beneath the frame and in position for engagement with the ground, a chute communicating with the feed-box and with the upper ends of the stock, said stock having an opening therein at its rearward portion above the foot, and having a second opening adjacent to its lower end, and removable closures for the openings.

11. An implement of the class described comprising a frame, a hopper, a shaft mounted in the frame, presser-wheels revolubly mounted upon the shaft, discharge mechanism for the hopper, connections between one of the presser-wheels and the discharge mechanism for operation of the latter when said presser-wheels are revolved, said connections being movable into and out of operative position, means for moving the connections, said means including a hand lever located at the forward end of the frame, drill-shoes connected with the frame forwardly of the presser-wheels and in the longitudinal planes thereof, said shoes being movable into and out of operative position, a second hand-lever located adjacent to the forward end of the frame, connections between the second hand-lever and the shoes for movement of the latter when the hand-lever is moved, means for holding the shoes yieldably in operative position, chutes connected with the hopper and with the shoes, ground-treating teeth carried by the frame forwardly of the shoes and movable into and out of operative position, means for moving the said teeth, said means including a hand-lever located adjacent to the forward end of the frame, ground-treating teeth pivoted in the frame rearwardly of the presser-wheels for movement into and out of operative position, a fourth hand-lever located adjacent to the forward end of the frame, connections between the fourth hand-lever and the second-named ground-treating teeth for movement thereof when the hand-lever is moved, separate means for holding the first and second named ground-treating teeth yieldably in operative position and steadying-wheels carried by the shaft outwardly of the first-named wheels, said implement being adapted at its forward end for connection to another implement.

In testimony whereof, I affix my signature, in presence of two witnesses.

HENRY T. MONSON.

Witnesses:
K. S. GROTH,
C. W. LAWSON.